(12) United States Patent
Kim

(10) Patent No.: US 7,783,087 B2
(45) Date of Patent: Aug. 24, 2010

(54) COMMUNICATION TERMINAL AND METHOD OF INSERTING SYMBOLS THEREOF

(75) Inventor: Han Kyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 981 days.

(21) Appl. No.: 11/369,325

(22) Filed: Mar. 6, 2006

(65) Prior Publication Data

US 2006/0210127 A1     Sep. 21, 2006

(30) Foreign Application Priority Data

Mar. 4, 2005     (KR) ...................... 10-2005-0018100

(51) Int. Cl.
*G06K 9/00*     (2006.01)

(52) U.S. Cl. .................. 382/124; 382/127; 382/125; 382/156; 382/168; 382/126

(58) Field of Classification Search ................ 382/124, 382/125, 126, 127, 168, 156; 345/156, 168
See application file for complete search history.

(56) References Cited

U.S. PATENT DOCUMENTS

| | | | |
|---|---|---|---|
| 5,982,302 A * | 11/1999 | Ure | 341/22 |
| 6,307,549 B1 * | 10/2001 | King et al. | 715/810 |
| 7,020,270 B1 * | 3/2006 | Ghassabian | 379/368 |
| 2002/0005837 A1 | 1/2002 | Thomason et al. | |
| 2005/0174325 A1 * | 8/2005 | Setlak | 345/156 |
| 2006/0110013 A1 | 5/2006 | Lee | |

FOREIGN PATENT DOCUMENTS

| | | |
|---|---|---|
| CN | 1408144 | 4/2003 |
| JP | 2002007335 | 1/2002 |
| JP | 2003-529130 | 9/2003 |
| WO | 01/31788 | 5/2001 |
| WO | WO 02/27455 | 4/2002 |

* cited by examiner

*Primary Examiner*—Matthew C Bella
*Assistant Examiner*—Mike Rahmjoo
(74) *Attorney, Agent, or Firm*—Lee, Hong, Degerman, Kang & Waimey

(57) ABSTRACT

A mobile communication terminal and method of inserting symbols thereof are disclosed, by which a convenient symbol input system is provided and by which a user is facilitated to input a symbol using a fingerprint pattern of the user. The present invention includes a fingerprint recognizer, a control unit searching a symbol matched to the recognized fingerprint pattern if a fingerprint pattern is recognized by the fingerprint recognizer, and an output unit outputting the searched symbol.

19 Claims, 4 Drawing Sheets

COMMUNICATION TERMINAL AND METHOD OF INSERTING SYMBOLS THEREOF

CROSS REFERENCE TO RELATED APPLICATION

This application claims the benefit of the Korean Patent Application No. 10-2005-0018100, filed on Mar. 4, 2005, which is hereby incorporated by reference as if fully set forth herein.

BACKGROUND OF THE INVENTION

1. Field of the Invention

The present invention relates to a mobile communication terminal and method of inserting symbols thereof. Although the present invention is suitable for a wide scope of applications, it is particularly suitable for supporting a symbol input.

2. Discussion of the Related Art

Generally, a communication terminal, and more particularly, a mobile communication terminal supports a messaging service for transmitting/receiving a message.

For the messaging service, a mobile communication terminal is provided with functions for performing a task for creating a message, a task for transmitting a message, a task for receiving a message and a task for managing the a received message.

Meanwhile, the mobile communication terminal is further provided with various functions enabling a user to input characters, numbers and symbols using keys provided to the mobile communication terminal such as a schedule management, a phone number storage, etc. as well as the above-explained functions for the messaging service.

Yet, in a related art, a user has many difficulties in inputting the characters, numbers and symbols to the mobile communication terminal. Specifically, it is inconvenient for a user to input the symbols as follows.

First of all, in order to input symbols, while inputting characters, a user needs to switch a mode from a character input mode to a symbol input mode. The user seeks a symbol to be inputted from a symbol set provided in the symbol input mode and then inputs the sought symbol. Hence, it is inconvenient for the user to go through the complicated processes.

Secondly, most of symbols are not frequently used for a character input. In particular, a user uses several symbols within a symbol set provided in a symbol input mode. Considering the number of symbols practically used by a user, a mobile communication terminal provides too many symbols. So, a user has to search a specific symbol to be inputted from the entire symbols provided by the mobile communication terminal. Hence, it takes too much time to input a corresponding symbol.

FIG. 1 is a diagram for explaining a symbol input according to a related art, in which a task for creating a text message is shown for example.

Referring to FIG. 1, a user creates a message using characters in a character input mode for an input of a message content of a mobile communication terminal. In this case, the mobile communication terminal displays a content 'Good morning' of the message that is being created via a display means (e.g., LCD).

Meanwhile, if the user selects a switching to a symbol input mode for a symbol input via a menu, i.e., if a user selects "4. symbol" from a menu including several items (1. number, 2. small letter, 3. capital letter, 4. symbol, . . . ), the mobile communication terminal is switched to the symbol input mode from the character input mode. And, the mobile communication terminal displays a previously stored symbol set via the display means.

If the user selects a symbol from the symbol set, the mobile communication terminal inserts the selected symbol in the content of the message that is being created. The mobile communication terminal then displays the content (Good morning!) of the message according to a corresponding result via the display means.

Thus, in the related art, there exits inconvenience that the input mode should be entered to use a symbol in the process of creating the content of the message with characters.

The same inconvenience results from the functions of schedule management, phonebook storage and the like as well as the creation off the message. Namely, in case of using a symbol while a character is inputted to register a schedule or to store a phone number, the input mode should be entered.

Moreover, after the symbol input mode has been entered, there still exists another inconvenience that specific symbols should be searched one by one from the symbol set provided by the mobile communication terminal.

SUMMARY OF THE INVENTION

Accordingly, the present invention is directed to a mobile communication terminal and method of inserting symbols thereof that substantially obviate one or more problems due to limitations and disadvantages of the related art.

An object of the present invention is to provide a mobile communication terminal and method of inserting symbols thereof, by which a convenient symbol input system is provided to a user.

Another object of the present invention is to provide a mobile communication terminal and method of inserting symbols thereof, by which a user is facilitated to input a symbol using a fingerprint pattern of the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication terminal according to the present invention includes a fingerprint recognizer, a control unit searching a symbol matched to a recognized fingerprint pattern which is recognized by the fingerprint recognizer, and an output unit outputting the searched symbol.

Preferably, the communication terminal further includes a memory storing a plurality of symbol data corresponding to a plurality of symbols including the searched symbol.

More preferably, a plurality of the symbol data are matched to different fingerprint patterns registered via the fingerprint recognizer, respectively.

More preferably, the different fingerprint patterns are identified from each other by a number of counts that a user fingerprint is contacted with the fingerprint recognizer in a registration via the fingerprint recognizer.

More preferably, each of the different fingerprint patterns is identified by a finger type of a user fingerprint registered via the fingerprint recognizer.

More preferably, each of the different fingerprint patterns is identified by a combination of at least one of a finger type of a user fingerprint registered via the fingerprint recognizer and a number of counts that the user fingerprint is contacted with the fingerprint recognizer.

More preferably, the different fingerprint patterns are identified by user's different activity patterns in contacting a finger with the fingerprint recognizer.

Preferably, the control unit inserts the searched symbol into a content of a message outputted via the output unit as the fingerprint pattern is recognized via the fingerprint recognizer in executing a task for a creation of the message.

Preferably, the control unit inserts the searched symbol into a character sequence outputted via the output unit as the fingerprint pattern is recognized via the fingerprint recognizer in executing a task for a creation of the character sequence.

In another aspect of the present invention, a communication terminal includes a fingerprint recognizer recognizing a fingerprint pattern, a control unit matching the fingerprint pattern recognized by the fingerprint recognizer to a symbol in a registration process, the control unit searching the symbol in an execution of a task for creating a character sequence as the fingerprint pattern is recognized by the fingerprint recognizer, and an output unit appending the searched symbol to the character sequence to output according to a control of the control unit.

Preferably, the communication terminal further includes a memory storing a plurality of symbols including the searched symbols, the memory matching to store different fingerprint patterns to a plurality of the symbols according to the control of the control unit, respectively.

More preferably, the different fingerprint patterns are identified by user's different activity patterns in contacting a finger with the fingerprint recognizer.

More preferably, the activity pattern indicates an activity that the user contacts a fingerprint with the fingerprint recognizer for predetermined times.

More preferably, the activity pattern indicates an activity that the user contacts a finger of a different type with the fingerprint recognizer.

Preferably, the task is to create a content of a message for a messaging service.

In another aspect of the present invention, in a communication terminal having a fingerprint recognizer, a method of inserting a symbol into a character sequence includes the steps of recognizing a fingerprint pattern via the fingerprint recognizer, searching a symbol matched to the recognized fingerprint pattern, and inserting the searched symbol into the character sequence.

Preferably, the character sequence is a content of a message that is being created for a messaging service.

Preferably, the method further includes the step of matching to register different fingerprint patterns to a plurality of symbols including the searched symbol, respectively.

More preferably, the different fingerprint patterns are identified from each other by a number of counts that a user fingerprint is contacted with the fingerprint recognizer.

More preferably, the different fingerprint patterns are identified from each other by a finger type of a user fingerprint contacted with the fingerprint recognizer.

In another aspect of the present invention, in a mobile communication terminal having a fingerprint recognizer, a method of inserting a symbol into a message in an execution of a task for a creation of the message includes the steps of storing the symbol in advance by matching the symbol to a fingerprint pattern recognized by the fingerprint recognizer, displaying a content of the message that is being created according to the execution of the task, searching the symbol as the fingerprint pattern is recognized via the fingerprint recognizer, and combining the searched symbol with a character sequence corresponding to the content of the message to display.

Preferably, the fingerprint pattern is identified by a number of counts that a user fingerprint is contacted with the fingerprint recognizer.

Preferably, the fingerprint pattern is identified by a finger type of a user fingerprint contacted with the fingerprint recognizer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
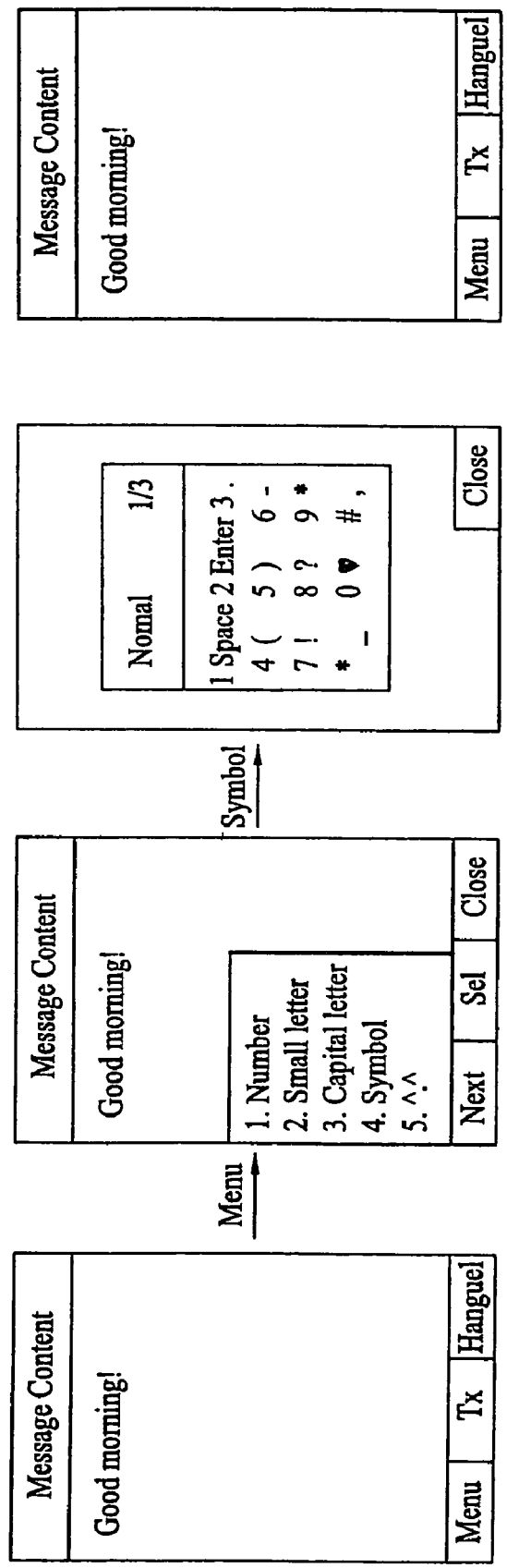
FIG. 1 is a diagram for explaining a symbol input according to a related art.

Reference will now be made in detail to the preferred embodiments of the present invention, examples of which are illustrated in the accompanying drawings. Wherever possible, the same reference numbers will be used throughout the drawings to refer to the same or like parts.

First of all, a communication terminal according to the present invention preferably includes a mobile communication terminal. More particularly, a communication terminal according to the present invention includes a mobile communication terminal provided with a fingerprint recognizer recognizing a user's fingerprint pattern.

In particular, a mobile communication terminal according to the present invention includes a fingerprint recognizer, a memory, a control unit and an output unit.

The fingerprint recognizer recognizes a user's fingerprint pattern. And, the fingerprint recognizer senses a finger activity pattern such as a finger motion, finger directionality and the like as well as a user's fingerprint.

The fingerprint pattern can be identified by a different activity pattern that a user touches the fingerprint recognizer.

In particular, the fingerprint pattern is identified by the number of counts that a fingerprint is contacted with the fingerprint recognizer by the user. Alternatively, the fingerprint pattern is identified by a finger type that the user registers to (contacts with) the fingerprint recognizer. Alternatively, the fingerprint pattern is determined by combining the number of counts of contacting the fingerprint at the fingerprint recognizer with the finger type of the contacted fingerprint. Namely, the fingerprint pattern is determined by the number of fingerprint contacts per user's finger type.

The memory stores a plurality of symbol data corresponding to a plurality of the symbols.

And, the control unit matches a user's specific fingerprint pattern to a specific symbol stored in the memory. The control unit matches the corresponding fingerprint pattern to the symbol in the memory. And, the control unit registers matched fingerprint patterns with the symbols using the fingerprint recognizer.

Meanwhile, the mobile communication terminal has a function of executing a character sequence creating task for creating a specific character or a character sequence, such as a message creating task. And, the mobile communication terminal has a function of executing a fingerprint pattern registering task for registering a fingerprint pattern matched to a symbol. Moreover, the control unit is in charge of controlling the above-explained tasks.

In particular, the control unit executes the fingerprint pattern registering task in a manner of matching a fingerprint pattern recognized by the fingerprint recognizer to a symbol stored in the memory and storing the matched fingerprint pattern in the memory. As an alternative, the control unit generates a table comprising a plurality of matched combination of a fingerprint pattern and a symbol by the finger print registering task, and stores it in the memory. The control unit matches and stores one fingerprint pattern to only one symbol or one fingerprint pattern to a symbol set comprising a plurality of symbols.

Once a fingerprint pattern is recognized by the fingerprint recognizer while executing the character sequence creating task, the control unit searches a symbol matched to the recognized fingerprint pattern from the memory. The control unit then outputs the searched symbol via the output unit. In this case, it is preferable that the output unit is a display means (e.g., LCD) that displays the searched symbol appended to a character or a character sequence that is being created.

However, in case that one fingerprint pattern is matched to a symbol set comprising a plurality of symbols, the control unit searches the symbol set from the memory and outputs the symbol set.

For instance, while the text message creating task for creating a text message is being executed, if a fingerprint pattern is recognized by the fingerprint recognizer, the control unit searches a matched symbol or symbol set from the memory using the recognized fingerprint pattern. In the case of searching for a symbol set, the control unit supports for a user to select one or more symbols from the symbol set and designates the user-selected symbol(s) as symbols to be inserted.

If the symbol matched to the recognized fingerprint pattern exists, the control unit inserts the corresponding symbol into a content of a message that is being created. In other words, the control unit inserts the matched symbol into a current cursor position according to the creation of the message in the content of the message outputted via the output unit.

For another instance, while the character sequence creating task for the character or character sequence creation is being executed, if a fingerprint pattern is recognized by the fingerprint recognizer, the control unit searches a matched symbol or symbol set from the memory using the recognized fingerprint pattern. Again, in the case of searching for a symbol set, the control unit supports for a user to select one or more symbols from the symbol set.

If the symbol matched to the recognized fingerprint pattern exists, the control unit combines the corresponding symbol with a currently created character or character sequence. In other words, the control unit inserts the matched symbol into a current cursor position according to the character or character sequence creation in the character or character sequence outputted via the output unit.

In brief, in case that a user registers her/his fingerprint to the fingerprint recognizer, i.e., in case of a registration process, the control unit of the present invention matches the fingerprint pattern recognized by the fingerprint recognizer to the symbol or symbol set selected by the user and then stores it. In case that the character sequence creating task for creating a character or character sequence like the message creating task is executed, the control unit searches a symbol or symbol set matched to the fingerprint pattern recognized by the fingerprint recognizer.

Meanwhile, if a user contacts her/his fingerprint with the fingerprint recognizer, the control unit identifies a fingerprint pattern by the number of counts that the user's fingerprint is contacted with the fingerprint recognizer. So, the control unit matches different fingerprint patterns identified by the number of counts of touching the fingerprint recognizer to different symbols stored in the memory, respectively.

For instance, a first fingerprint pattern that a user contacts her/his fingerprint with the fingerprint recognizer twice is matched to "!". And, a second fingerprint pattern that a user contacts her/his fingerprint with the fingerprint recognizer once is matched to "?".

If a user contacts her/his fingerprint with the fingerprint recognizer, the control unit of the present invention identifies a fingerprint pattern by a type of a finger that makes a user's fingerprint contacted with the fingerprint recognizer. So, the control unit matches different fingerprint patterns identified by the type of the finger contacted with the fingerprint recognizer to different symbols stored in the memory, respectively.

For instance, a third fingerprint pattern that a user contacts her/his thumb with the fingerprint recognizer is matched to "!". And, a fourth fingerprint pattern that a user contacts her/his index finger with the fingerprint recognizer is matched to "?".

Meanwhile, if a user contacts her/his fingerprint with the fingerprint recognizer, the control unit identifies a fingerprint pattern by combining a type of a finger with the number of counts that the user's fingerprint is contacted with the fingerprint recognizer. So, the control unit matches different fingerprint patterns identified by the combination of the type of the finger that makes a user's fingerprint contacted with the fingerprint recognizer and the number of counts of touching the fingerprint recognizer to the different symbols stored in the memory, respectively.

For instance, a first fingerprint pattern that a user contacts her/his thumb with the fingerprint recognizer once is matched to "!". A second fingerprint pattern that a user contacts her/his thumb with the fingerprint recognizer twice is matched to "?". A third fingerprint pattern that a user contacts her/his index finger with the fingerprint recognizer once is matched to "#". And, a fourth fingerprint pattern that a user contacts her/his index finger with the fingerprint recognizer twice is matched to "$".

In brief, the control unit identifies a fingerprint pattern according to a different activity pattern that a user contacts her/his finger with the fingerprint recognizer and then matches the identified fingerprint pattern to a corresponding symbol stored in the memory. In this case, the activity pattern indicates how many times a user contacts her/his fingerprint with the fingerprint recognizer or what type of finger the user contacts with the fingerprint recognizer.

The control unit uses a combination of a fingerprint pattern (the type of finger and/or the number of contacts at the fingerprint recognizer) and an operation of pressing certain keys in the communication terminal as a means of classifying symbols. Therefore, the control unit searches the symbol in the memory if there exist a recognized fingerprint pattern (the type of finger and/or the number of contacts at the fingerprint recognizer) and an operation of pressing certain keys in the communication terminal. The above procedure of combining a fingerprint pattern with an operation of pressing certain keys applies to the following registration procedure or the procedure of inserting symbols via recognizing a fingerprint.

Figure 2:
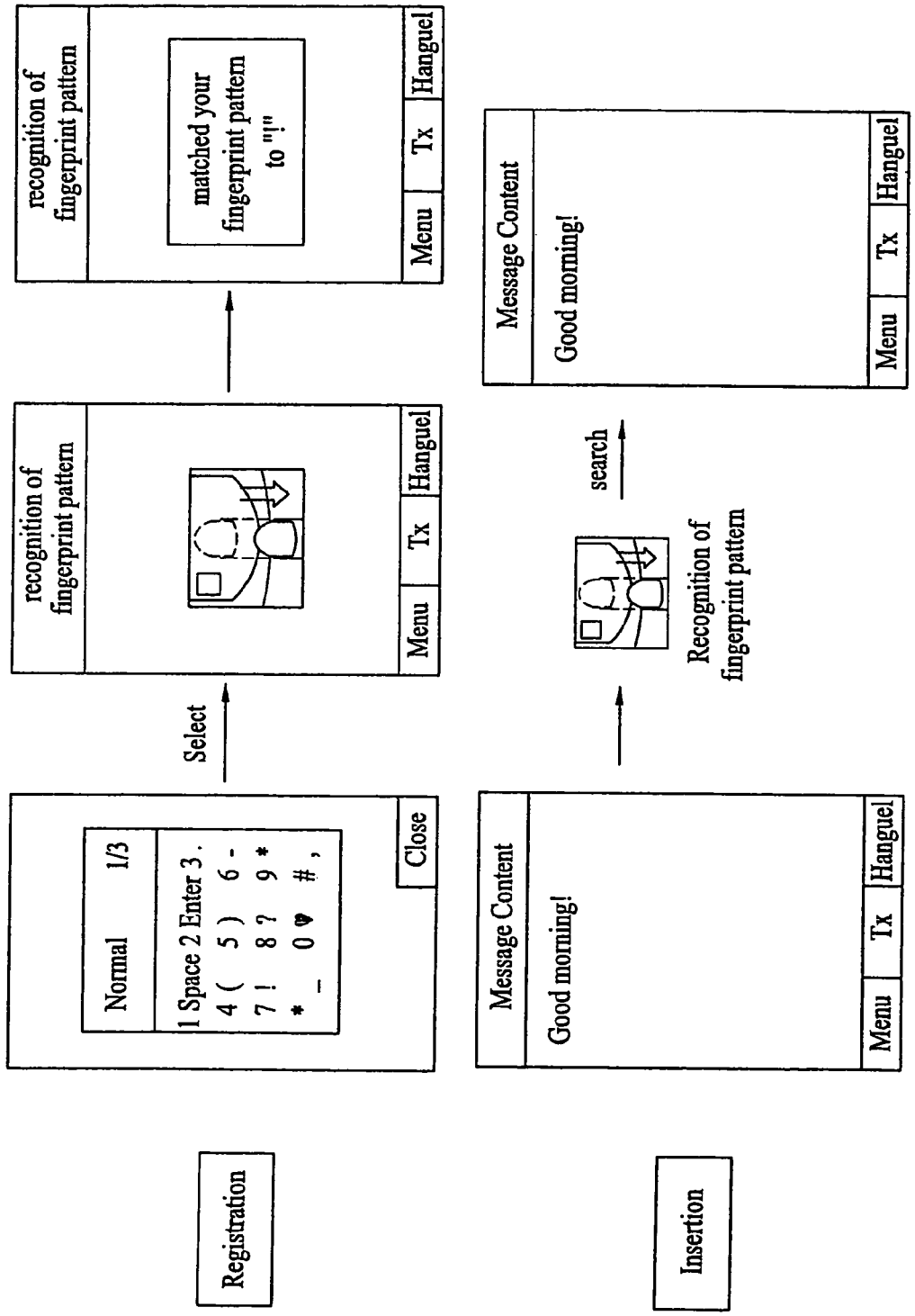
FIG. 2 is a diagram for explaining a registration of a fingerprint pattern and a symbol insertion using the fingerprint pattern according to the present invention.

FIG. 2 is a diagram for explaining a registration of a fingerprint pattern and a symbol insertion using the fingerprint pattern according to the present invention.

Referring to FIG. 2, a fingerprint pattern registration follows the execution of a fingerprint pattern registering task. As the fingerprint pattern registering task is executed, a control unit displays a symbol table stored in advance. The symbol table comprises a plurality of symbols, especially as symbol sets.

If a user selects a symbol or symbol set from the symbol table, the control unit requests a registration of a fingerprint pattern to be matched to the selected symbol. In particular, the control unit displays a sentence requesting a fingerprint pattern recognition such as "contacting a fingerprint with a fingerprint recognizer as a specific pattern". The control unit then activates an operation of the fingerprint recognizer.

Assuming that a user makes her/his fingerprint recognized twice up and down, the control unit designates the activity pattern of making the fingerprint recognized twice up and down as the fingerprint pattern to be matched to the selected symbol or symbol set.

Hence, the control unit matches the selected symbol or symbol set to the corresponding fingerprint pattern and then stores it in the memory. Thus, the fingerprint pattern registration for a symbol is completed. After completion of the fingerprint pattern registration, a completion-indicating sentence "matched your fingerprint pattern to '!'" is displayed via a display means.

After the completion of the fingerprint pattern registration, a symbol insertion follows an execution of a character sequence creating task for the character or character sequence creation such as a message creating task.

As the character sequence task is executed, a user creates a character or a character sequence in a character input mode of the character sequence creating task. The control unit then displays a character or character sequence created by a key manipulation of the user via a display means.

Meanwhile, if a user contacts her/his fingerprint with a fingerprint recognizer to have a specific fingerprint pattern recognized in the course of creating the character or character sequence, the control unit searches a symbol or symbol set matched to the recognized fingerprint pattern from a memory. The detailed description of searching a symbol set is omitted.

Subsequently, the control unit inserts the symbol matched to the fingerprint pattern into the character or character sequence that is being created.

For instance, after "!" has been registered by being matched to the fingerprint pattern of recognizing a fingerprint twice up and down, the user contacts her/his finger with the fingerprint recognizer in the course of creating a character or a character sequence so that the fingerprint can be recognized twice up and down. If so, the control unit searches the corresponding symbol "!" from the memory and then insets the searched symbol into a currently created character or character sequence. Subsequently, the user presses keys corresponding to a character to continue the character or character sequence creation.

Figure 3:
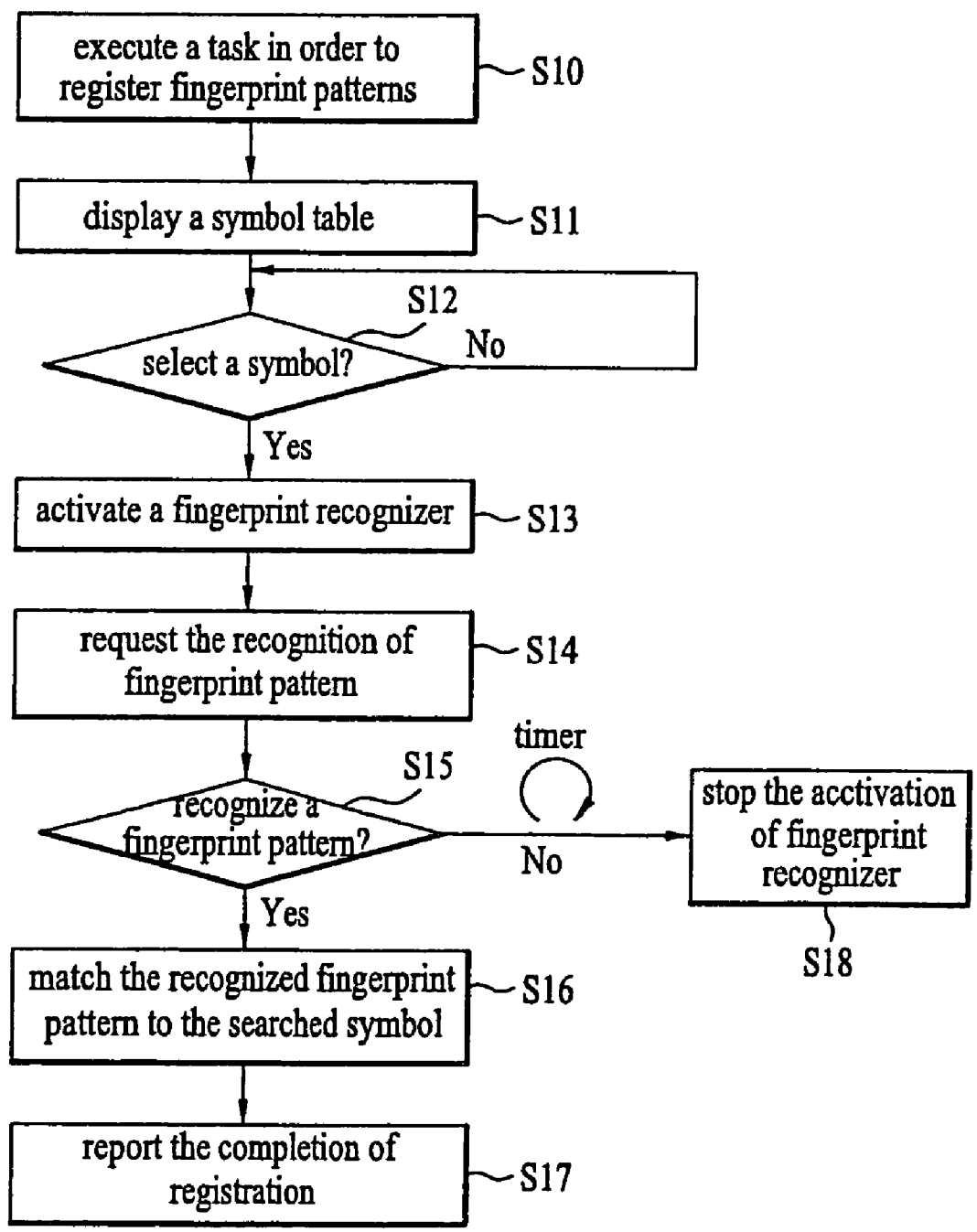
FIG. 3 is a flowchart of a procedure for a fingerprint pattern registration for a symbol according to the present invention.

FIG. 3 is a flowchart of a procedure for a fingerprint pattern registration for a symbol according to the present invention. The registration procedure of fingerprint patterns for symbol sets is readily understood from the procedure of FIG. 3

Referring to FIG. 3, a fingerprint pattern registration is carried out in a manner of matching a fingerprint pattern to a user-preferred symbol, i.e., a frequently used symbol and storing it in a memory.

First of all, a control unit executes a fingerprint pattern registering task (S10).

As the fingerprint pattern registering task is executed, the control unit displays a previously stored symbol table (S11). In particular, the control unit displays a table including a plurality of symbols via a display means.

If a user selects a symbol from the symbol table (S12), the control unit activates an operation of a fingerprint recognizer (S13). In this case, the control unit requests a user to make a fingerprint pattern recognized to be matched to the selected symbol (S14).

Once a fingerprint pattern is recognized via the fingerprint recognizer (S15), the control unit matches the recognized fingerprint pattern to the previously selected symbol and then stores it in a memory (S16).

The control unit matches different fingerprint patterns to a plurality of symbols stored in the memory, respectively. For this, the control unit identifies each of the fingerprint patterns according to the number of counts that a user contacts her/his finger with the fingerprint recognizer and then matches the identified fingerprint pattern to the corresponding symbol.

And, the control unit identifies fingerprint patterns according to a finger type of a user contacted with the fingerprint recognizer and then matched the identified fingerprint pattern to the corresponding symbol.

Thus, the registration of the fingerprint pattern for a symbol is completed. The control unit outputs the completion via the display means. In particular, the control unit notifies the registration completion of the fingerprint pattern for a symbol (S17).

If the fingerprint pattern is not recognized by the fingerprint recognizer within a predetermined duration (timer expiration), the control unit terminates the activation of the fingerprint recognizer (S18).

Figure 4:
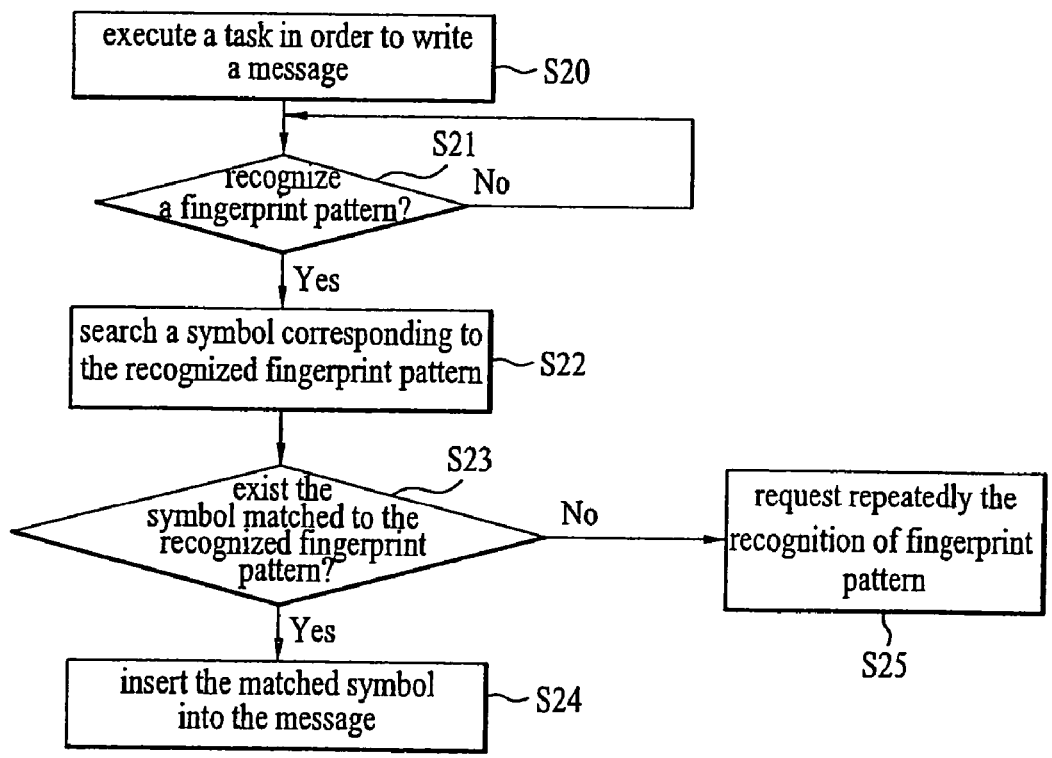
FIG. 4 is a flowchart of a symbol insertion procedure using a fingerprint pattern according to the present invention.

FIG. 4 is a flowchart of a symbol insertion procedure using a fingerprint pattern according to the present invention, in which a symbol insertion in a message-creating task among character sequence creating tasks is shown.

Referring to FIG. 4, after the fingerprint pattern registering process, if there is a message creating request, the control unit executes a message creating task (S20).

According to the execution of the message creating task, a user creates a character or a character sequence using keys provided to the mobile communication terminal (S20). The character or character sequence that is being created is displayed via a display means. In particular, a content of a message is displayed via the display means.

While the character or character sequence is being created, the control unit checks whether a fingerprint pattern is recognized by a fingerprint recognizer (S21).

If a fingerprint pattern is recognized by the fingerprint recognizer, the control unit searches a symbol matched to the recognized fingerprint pattern from a memory (S22).

If the symbol matched to the fingerprint pattern exists in the memory (S23), the control unit outputs the corresponding symbol to apply to the currently created character or character sequence (S24). In particular, the control unit inserts the searched symbol into the currently created character or character sequence. In this case, the currently created character or character sequence is a content of a message.

Hence, after the searched symbol has been combined with the content of the message, a corresponding character sequence is displayed via the display means.

Otherwise, if the symbol matched to the recognized fingerprint pattern does not exist in the memory, the control unit re-requests a fingerprint pattern recognition via the fingerprint recognizer to a user for predetermined times.

Subsequently, the user keeps creating a character or character sequence using keys.

Accordingly, the present invention provides the following effects or advantages.

First of all, the present invention can directly input symbols frequently used by a user in the course of the character input without entering the symbol input mode from the character input mode. Hence, it is convenient for a user to directly input symbols.

Secondly, in creating a character or a character sequence for a message creation or the like, it is unnecessary to search a specific symbol from a symbol set. Hence, the present invention enables a faster character sequence creation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A communication terminal comprising:
   a fingerprint recognizer for receiving and recognizing a fingerprint pattern;
   a control unit for requesting registration of the received fingerprint pattern by displaying a symbol table previously stored in the communication terminal, activating the fingerprint recognizer to recognize the received fingerprint pattern when the control unit detects a symbol being preselected from the symbol table, matching the recognized fingerprint pattern with the preselected symbol, and storing the preselected symbol, wherein the control unit searches for the stored symbol when the fingerprint recognizer recognizes the registered fingerprint pattern following insertion of at least one character into a message performed by pressing keys of the communication terminal; and
   an output unit for inserting the searched symbol into the message in combination with the inserted at least one character.

2. The communication terminal of claim 1, further comprising a memory storing a plurality of symbol data corresponding to a plurality of symbols including the searched symbol.

3. The communication terminal of claim 2, wherein the plurality of symbol data is identified in combination with different fingerprint patterns recognized via the fingerprint recognizer during a key operation of the communication terminal.

4. The communication terminal of claim 2, wherein each of the plurality of symbol data is matched to a different one of a plurality of fingerprint patterns registered by the control unit via the fingerprint recognizer.

5. The communication terminal of claim 4, wherein each of the plurality of fingerprint patterns is distinguished from the other of the plurality of fingerprint patterns by a number of contacts that a user fingerprint makes with the fingerprint recognizer when registered by the control unit via the fingerprint recognizer.

6. The communication terminal of claim 4, wherein each of the plurality of fingerprint patterns is identified by a type of a user's finger registered by the control unit via the fingerprint recognizer.

7. The communication terminal of claim 4, wherein each of the plurality of fingerprint patterns is identified by a combination of at least a type of a user's finger registered by the control unit via the fingerprint recognizer or a number of contacts that the user fingerprint makes with the fingerprint recognizer.

8. The communication terminal of claim 4, wherein the plurality of different fingerprint patterns are identified by different activity patterns made by a user fingerprint contacting the fingerprint recognizer.

9. The communication terminal of claim 1, wherein the control unit inserts the searched symbol into content of the message that is output via the output unit when the fingerprint pattern is recognized via the fingerprint recognizer when the message is being created.

10. The communication terminal of claim 1, wherein the control unit inserts the searched symbol into a key-manipulated character sequence that is output via the output unit when the fingerprint pattern is recognized via the fingerprint recognizer during creation of the character sequence.

11. A communication terminal comprising:
    a fingerprint recognizer for receiving and recognizing a fingerprint pattern;
    a control unit for requesting registration of the received fingerprint pattern by displaying a symbol table previously stored in the communication terminal, activating the fingerprint recognizer to recognize the received fingerprint pattern when the control unit detects a symbol being preselected from the symbol table, matching the recognized fingerprint pattern with the preselected symbol, and storing the preselected symbol, wherein the control unit searches for the stored symbol when the fingerprint recognizer recognizes the registered fingerprint pattern after creating a character sequence by inserting at least one character into a message by pressing keys of the communication terminal; and
    an output unit for inserting the searched symbol into the character sequence in combination with the inserted at least one character under control of the control unit.

12. The communication terminal of claim 11, further comprising a memory storing a plurality of symbols including searched symbols, wherein the memory stores a different one of a plurality of fingerprint patterns with each of the plurality of symbols under control of the control unit.

13. The communication terminal of claim 12, wherein each of the plurality of fingerprint patterns is identified by a different activity pattern when a user's finger contacts the fingerprint recognizer.

14. The communication terminal of claim 13, wherein the different activity pattern corresponds to an activity when the user's finger contacts the fingerprint recognizer for a predetermined number of times.

15. The communication terminal of claim 13, wherein the different activity pattern corresponds to an activity when the user's finger of a different type contacts the fingerprint recognizer.

16. The communication terminal of claim 11, wherein creating the character sequence comprises creating the content of the message for a messaging service.

17. A method of inserting a symbol into a message when creating the message in a mobile communication terminal having a fingerprint recognizer, the method comprising:
  requesting registration of a fingerprint pattern, by a control unit of the mobile communication terminal, the registration comprising:
    displaying a symbol table,
    preselecting a symbol from the symbol table,
    activating the fingerprint recognizer,
    receiving a fingerprint pattern at the fingerprint recognizer,
    recognizing the received fingerprint pattern by the fingerprint recognizer,
    matching the preselected symbol to the recognized fingerprint pattern, and
    storing the matched symbol with the recognized fingerprint pattern;
  displaying content of the message that is being created by inserting at least one character into the message by pressing keys of the mobile communication terminal;
  searching for the stored symbol that corresponds to the registered fingerprint pattern when the fingerprint recognizer recognizes the registered fingerprint pattern following insertion of the at least one character; and
  inserting the searched symbol into the at least one character of the message such that the searched symbol is part of the displayed content of the message.

18. The method of claim 17, wherein the fingerprint pattern is identified by a number of contacts between a user's finger and the fingerprint recognizer.

19. The method of claim 17, wherein the fingerprint pattern is identified by a type of a user's finger that contacts the fingerprint recognizer.

* * * * *